(12) United States Patent
Kerzner

(10) Patent No.: US 10,511,719 B2
(45) Date of Patent: *Dec. 17, 2019

(54) DOORBELL CALL CENTER

(71) Applicant: Alarm.com Incorporated, Tysons, VA (US)

(72) Inventor: Daniel Todd Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,004

(22) Filed: Feb. 25, 2019

(65) Prior Publication Data

US 2019/0191033 A1 Jun. 20, 2019

Related U.S. Application Data

(63) Continuation of application No. 15/811,141, filed on Nov. 13, 2017, now Pat. No. 10,218,855.
(Continued)

(51) Int. Cl.
*H04M 11/04* (2006.01)
*G08B 13/196* (2006.01)
(Continued)

(52) U.S. Cl.
CPC ..... *H04M 11/045* (2013.01); *G08B 13/19645* (2013.01); *G08B 13/19684* (2013.01);
(Continued)

(58) Field of Classification Search
CPC .................................. G06K 9/00771
See application file for complete search history.

(56) References Cited

U.S. PATENT DOCUMENTS 8,675,071 B1 3/2014 Slavin et al.
2004/0117638 A1 6/2004 Monroe
(Continued)

FOREIGN PATENT DOCUMENTS

CN 106097495 11/2016
JP 2011243054 12/2011

OTHER PUBLICATIONS

International Search Report and Written Opinion in International Application No. PCT/US2017/061577, dated Jan. 25, 2018, 6 pages.
(Continued)

*Primary Examiner* — Nabil H Syed
*Assistant Examiner* — Cal J Eustaquio
(74) *Attorney, Agent, or Firm* — Fish & Richardson P.C.

(57) ABSTRACT

Techniques are described for enabling a service administrator to respond to a detected doorbell press at a property when an authorized user is unavailable to respond. In some implementations, a determination that a doorbell press has been detected at a property is made. Video data collected by a doorbell device of the property is obtained in response to determining that the doorbell press has been detected at the property. Sensor data collected by one or more sensors of a monitoring system located within the property is obtained in response to determining that the doorbell press has been detected at the property. A present security risk for the property is determined based at least on the obtained sensor data and the obtained video data. A communication session between the doorbell device and a server system associated with the monitoring system of the property is established in response to determining the present security risk for the property.

20 Claims, 6 Drawing Sheets

Related U.S. Application Data

(60) Provisional application No. 62/421,474, filed on Nov. 14, 2016.

(51) Int. Cl.
*H04L 29/08* (2006.01)
*H04N 7/18* (2006.01)
*H04M 11/02* (2006.01)
*G08B 21/04* (2006.01)
*G06K 9/00* (2006.01)

(52) U.S. Cl.
CPC .... *G08B 21/0476* (2013.01); *H04L 29/08099* (2013.01); *H04L 67/025* (2013.01); *H04L 67/12* (2013.01); *H04L 67/141* (2013.01); *H04L 67/22* (2013.01); *H04M 11/025* (2013.01); *H04N 7/186* (2013.01); *G06K 9/00228* (2013.01)

(56) References Cited

U.S. PATENT DOCUMENTS

| | | |
|---|---|---|
| 2004/0190767 A1 | 9/2004 | Tedesco |
| 2015/0049191 A1 | 2/2015 | Scalisi et al. |
| 2015/0059086 A1 | 3/2015 | Clough |
| 2015/0234048 A1 | 8/2015 | Miller |
| 2015/0347910 A1 | 12/2015 | Fadell et al. |
| 2016/0291966 A1 | 10/2016 | Johnson |

OTHER PUBLICATIONS

PCT International Preliminary Report on Patentability in International Application No. PCT/US2017/061577, dated May 23, 2019, 5 pages.

Extended European Search Report in European Application No. 17869889.0, dated Oct. 15, 2019, 7 pages.

DOORBELL CALL CENTER

CROSS-REFERENCE TO RELATED APPLICATION

This application is a continuation of U.S. application Ser. No. 15/811,141, filed Nov. 13, 2017, which claims the benefit of U.S. Provisional Patent Application No. 62/421,474, filed on Nov. 14, 2016 and titled "DOORBELL CALL CENTER." Both of these prior applications are incorporated by reference in their entirety.

TECHNICAL FIELD

This disclosure application relates generally to home monitoring technology and more particularly to doorbell devices.

BACKGROUND

The operation of connected devices within a property can be integrated to improve monitoring of the property. For example, data gathered by the connected devices can be aggregated to determine when people are present in the property.

SUMMARY

Techniques are described for enabling a service administrator to respond to a detected doorbell press at a property when an authorized user is unavailable to respond. For instance, a system includes a doorbell device that initially detects a doorbell press by a visitor. The doorbell device then transmits a request to a central monitoring station associated with the property. The service administrator responds to the request by initiating a two-way communication session between the central monitoring station and the doorbell device. A video or audio feed associated with the service administrator is then provided for output to the visitor through an output device (e.g., a display or microphone) associated with the doorbell device. In this regard, the service administrator can automatically respond to the doorbell press in the authorized user's absence in order to visually verify the risk of a security breach at the property resulting from the detected doorbell press.

In some implementations, the system is capable of automatically performing specific actions in response to detecting the doorbell press. For instance, the system may aggregate data collected from various sensors and devices located within the current property in order to identify present conditions at the time point of the detected doorbell press. The system then selects a designated action to perform based on comparing the present conditions of the property to predetermined conditions specified within a doorbell action repository. The doorbell action repository includes a list of actions that the system can take when the present conditions match a set of predetermined conditions. For example, the system can transmit a notification of the detected doorbell press to a user device if an authorized user for the property is presently located inside the property when the doorbell is pressed. In another example, the system can initiate a two-way communication session between a visitor that presses the doorbell and a service administrator associated with a central monitoring system if the authorized user is determined to be located outside the property at the time when the doorbell is pressed. In this regard, the system can use different types of data to identify the appropriate action to take in order to reduce the likelihood of an intrusion event taking place after the detected doorbell press.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

In the figures, like reference numbers represent corresponding parts throughout.

DETAILED DESCRIPTION

In general, techniques are described for enabling a service administrator to respond to a detected doorbell press at a property when an authorized user is unavailable to respond. For instance, a system includes a doorbell device that initially detects a doorbell press by a visitor. The doorbell device then transmits a request to a central monitoring station associated with the property. The service administrator responds to the request by initiating a two-way communication session between the central monitoring station and the doorbell device. A video or audio feed associated with the service administrator is then provided for output to the visitor through an output device (e.g., a display or microphone) associated with the doorbell device. In this regard, the service administrator can automatically respond to the doorbell press in the authorized user's absence in order to visually verify the risk of a security breach at the property resulting from the detected doorbell press.

Figure 1:
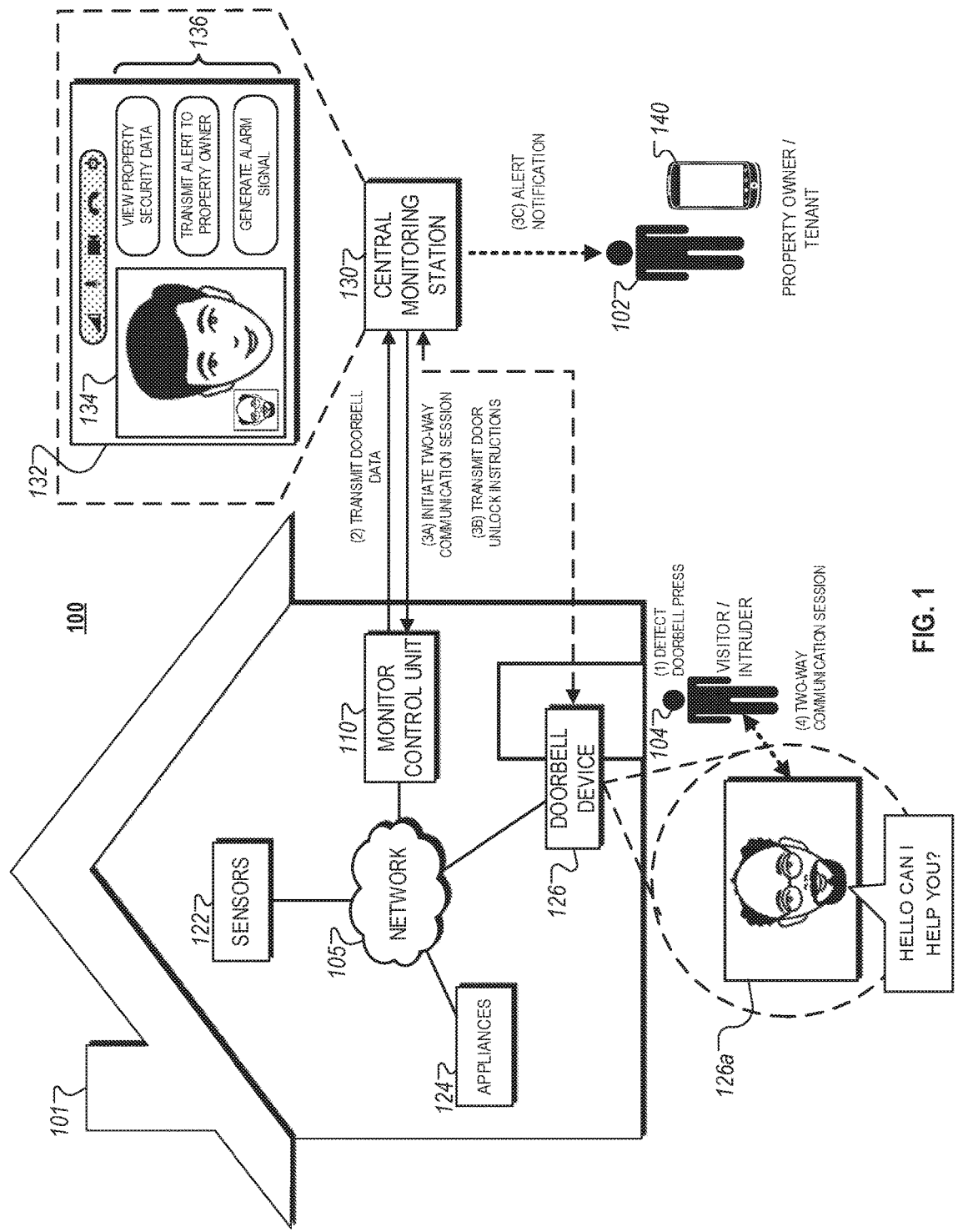
FIG. 1 illustrates an example of a system that is capable of automatically initiating a two-way communication session between a doorbell device and a central monitoring station.

FIG. 1 illustrates an example of a system 100 that is capable of automatically initiating a two-way communication session between a doorbell device and a central monitoring station. The system 100 is associated with a property 101 and may include a monitor control unit 110, sensors 122, appliances 124, and a doorbell device 126 that exchange communications over a network 105. The system 100 may also include a central monitoring station 130 that exchanges communications with the monitor control unit 110, and a mobile device 140 associated with a user 102 of the property 101.

Although FIG. 1 illustrates one property for clarity, the central monitoring station 130 may also collect and exchange data relating to multiple properties and/or structures. For example, the central monitoring station 130 may communicate directly with the monitoring control units of multiple properties over a cellular network, or through other communications media and protocol (e.g., through the local network 105, over Bluetooth, Zigbee, etc.).

In general, the architecture of the system 100 enables the doorbell device 126 to establish a two-way communication session with the central monitoring station 130 in response to receiving a doorbell press from an individual 104. The two-way communication session can be initiated when the user 102 is presently located outside the property 101 or otherwise unavailable to answer the door. For example, the user 102 may be on vacation, or may indicate that he/she should not be receiving notifications related to the property 101. In such an example, an administrator associated with the central monitoring station 130 can instead respond to the doorbell press to either inform the individual 104 that the user is presently unavailable, or if the individual 104 is likely to represent an intruder, dissuade the individual 104 from intruding upon the property 101 in the user's absence. The administrator may also trigger one or more security-related operations, which are described in more detail below.

In addition, the architecture of the system 100 enables the visual verification of a possible intruder prior to the dispatching of emergency services in response to detecting an intrusion or other type of security breach at the property 101. For example, the doorbell device 126 enables the recording of individuals that attempt to ring a doorbell in order to confirm that a property is vacant before intruding the premises. In addition, as described below, the system 100 enables a service administrator to automatically initiate a two-way communication session through the doorbell device 126 in response to detecting a doorbell press in order to verify whether the individual that rang the doorbell presents a security threat to the property 101.

Referring initially to the example depicted in FIG. 1, the individual 104 initially presses a doorbell associated with the property 101. Data indicating the doorbell press is then transmitted from the monitor control unit 110 to the central monitoring station 130. A service administrator associated with the central monitoring station 130 then operates an interface 132 to establish a two-way communication session between the central monitoring station 130 and the doorbell device 126 over the network 105. An output device associated with the doorbell device 126 then provides video or audio feed 126a of the administrator for output to the individual 104 nearby the front door of the property 101.

During the two-way communication session, the service administrator may use the interface 132 to inspect whether the individual 104 represents an actual visitor to the property or may likely to be an intruder that poses a security risk to the property 101. For example, the service administrator may view a video feed 134 of the individual 104 captured through the doorbell device 126 on the interface 132. The service administrator may also select various options 136 to perform follow-up inspections of the property 101.

For example, the service administrator may view property security data (e.g., a present security status for the property, sensor data recently collected by the sensors 122 and/or the appliances 124). In this example, the service administrator may inspect recent events that took place prior to or during the detected doorbell press to determine if the individual 104 has attempted to enter into property 101 using alternative means. In another example, the property administrator may also select an option to transmit an alert to the property owner (e.g., the authorized user 102). In this example, the central monitoring station 130 may transmit a text or voice notification to the user device 140 indicating the detected doorbell press and/or associated information such as a captured image of the authorized user 102, or the option to join or listen in on the ongoing two-way communication session between the central monitoring station 130 and the doorbell device 126. In yet another example, if the service administrator believes that the individual 104 is highly likely to represent an intruder and/or the present conditions of the property indicate a high risk of intrusion, the service administrator may select an option to generate an alarm signal for the property 101, which may then, for example, enable a siren within the property 101, automatically transmit an alert notification to local law enforcement agencies, or transmit an alert notification to the user device 140.

The local network 105 may be configured to enable electronic communications between devices connected to the local network 105. For example, the local network 105 may be configured to enable exchange of electronic communications between the monitor control unit 110, the sensors 122, and the appliances 124. The local network 105 may include, for example, Local Area Networks (LANs), for example, Wi-Fi, analog or digital wired and wireless telephone networks, for example, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data.

The local network 105 may include multiple networks or subnetworks, each of which may include, for example, a wired or wireless data pathway. The local network 105 may also include a circuit-switched network, a packet-switched data network, or any other network able to carry electronic communications (e.g., data or voice communications). For example, the local network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The local network 105 may include one or more networks that include wireless data channels and wireless voice channels. The local network 105 may also be a wireless network, a broadband network, or a combination of networks including a wireless network and a broadband network.

The monitor control unit 110 may be an electronic device that coordinates and/or monitors the operations of devices connected to the local network 105 such as the sensors 122, the appliances 124, and the doorbell device 126. In some instances, the monitor control unit 110 includes a controller and a network module. The controller is configured to control a system 100 (e.g., a HVAC system, an energy monitoring system) that includes the monitor control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitor control unit 110.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitor control unit 110 to communicate over a local area network and/or the Internet. The network module also may be a voice-band modem configured to enable the alarm panel to communicate over the telephone lines of Plain Old Telephone Systems (POTS).

The monitor control unit 110 also may include a communication module that enables the monitor control unit 110 to communicate other devices of the system 100. The communication module may be a wireless communication module that allows the monitor control unit 110 to communicate wirelessly. For instance, the communication module may be a Wi-Fi module that enables the monitor control unit 110 to communicate over a local wireless network at the property 101. The communication module further may be a 900 MHz wireless communication module that enables the monitor control unit 110 to communicate directly with a monitor control unit. Other types of short-range wireless communication protocols, such as Bluetooth, Bluetooth LE, Zwave, ZigBee, etc., may be used to allow the monitor control unit 110 to communicate with other devices in the property 101.

In some implementations, the monitor control unit 110 may include data capture and recording devices. In these examples, the monitor control unit 110 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

The monitor control unit 110 may exchange communications with the sensors 122, the appliances 124, the doorbell device 126, and the central monitoring station 130 using multiple communication links. The multiple communication links may be a wired or wireless data pathways configured to transmit signals from the sensors 122, the appliances 124, the doorbell device 126, and the central monitoring station 130 to the controller. The sensors 122, the appliances 124, the doorbell sensor 126, and the central monitoring station 130 may continuously transmit sensed values to the controller, periodically transmit sensed values to the monitor control unit 110, or transmit sensed values to the monitor control unit 110 in response to a change in a sensed value.

In some implementations, the monitor control unit 110 may additionally be used to perform routine surveillance operations on a property. For instance, the monitor control unit 110 may be assigned to one or more particular properties within a geographic location and may routinely collect surveillance footage during specified time periods (e.g., after dark), which may then be transmitted to the central monitoring station 130 for transmitting back to each particular property owner. In such implementations, the property owner may receive the surveillance footage over the local network 105 as a part of a service provided by a security provider that operates the central monitoring station 130. For example, transmissions of the surveillance footage collected by the monitor control unit 110 may be part of a premium security service package provided by a security provider in addition to the routine drone emergency response service.

In some implementations, the monitor control unit 110 may monitor the operation of the electronic devices of the system 100 such as the sensors 122, the appliances 124, the doorbell device 126, and the central monitoring station 130. For instance, the monitor control unit 110 may enable or disable the devices of the system 100 based on a set of rules associated with energy consumption, user-specified settings, and/or other information associated with the conditions near or within the property 101 where the system 100 is located. In some examples, the monitor control unit 110 may be used as a replacement to a traditional security panel (or monitor control unit) that is used to monitor and control the operations of the system 100. In other examples, the monitor control unit 110 may coordinate monitoring operations with a separate security panel of the system 100. In such examples, the monitor control unit 110 may monitor particular activities of the devices of the system 100 that are not monitored by the security panel, or monitor the operation of particular devices that are not monitoring by the security panel.

In some implementations, the monitor control unit 110 and/or the components of the monitor control unit 110 may partially or completely operate outside of the property 101. For example, the monitor control unit 110 may reside on the central monitoring station 130. In such examples, data collected by the sensors 122, the appliances 124, and the doorbell device 126 may be transmitted over the network 105 to the central monitoring station 130. In other examples, the monitor control unit 110 may be located on another remote server other than the central monitoring station 130 that exchanges data with the central monitoring station 130 through another cloud network.

As described above, the property 101 may include various monitoring devices that are each capable of performing individual monitoring operations and/or capable to performing a set of coordinated operations based on instructions received from either the monitor control unit 110 or the central monitoring station 130. For instance, the property 101 may include the sensors 122, the appliances 124, the doorbell device 126, and other devices that provide monitoring data associated with devices, areas, or individuals located nearby or within the premises of the property 101.

The sensors 122 may include one or more of a contact sensor, a motion sensor, a glass break sensor, an occupancy sensor, or any other type of sensor that can be included in an alarm or security system. The sensors 122 may also include an environmental sensor, such as a temperature sensor, a water sensor, a rain sensor, a wind sensor, a light sensor, a smoke detector, a carbon monoxide detector, an air quality sensor, etc. The sensors 122 may further include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

In some implementations, the sensors 122 may include one or more cameras. The cameras may be video/photographic cameras or other type of optical sensing devices configured to capture images. For instance, the cameras may be configured to capture images of an area within a building monitored by the monitor control unit 110. The cameras may be configured to capture single, static images of the area and also video images of the area in which multiple images of the area are captured at a relatively high frequency (e.g., thirty images per second). The cameras may be controlled based on commands received from the monitor control unit 110.

The cameras may be triggered by several different types of techniques. For instance, a Passive Infra Red (PIR) motion sensor may be built into the cameras and used to trigger the cameras to capture one or more images when motion is detected. The cameras also may include a microwave motion sensor built into the camera and used to trigger the cameras to capture one or more images when motion is detected. The cameras may have a "normally open" or "normally closed" digital input that can trigger capture of one or more images when external sensors (e.g., the sensors 122, PIR, door/window, etc.) detect motion or other events. In some implementations, the cameras receive a command to capture an image when external devices detect motion or another potential alarm event. The cameras may receive the command from the controller or directly from one of the sensors 122.

In some implementations, the cameras trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras may be programmed with any combination of time/day schedules, system "arming state", or other variables to determine whether images should be captured or not when triggers occur. The cameras may enter a low-power mode when not capturing images. In this case, the cameras may wake periodically to check for inbound messages from the controller. The cameras may be powered by internal, replaceable batteries if located remotely from the monitor control unit 110. The cameras may employ a small solar cell to recharge the battery when light is available. Alternatively, the cameras may be powered by the controller's 112 power supply if the cameras are co-located with the controller.

The appliances 124 may be home automation devices connected to the local network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the local network 105. In some instances, the appliances 124 may periodically transmit information and/or generated data to the monitor control unit 110 such that the monitor control unit 110 can automatically control the operation of the appliances 124 based on the exchanged communications. For example, the monitor control unit 110 may operate one or more of the appliances 124 based on a fixed schedule specified by the user. In another example, the monitor control unit 110 may enable or disable one or more of the appliances 124 based on received sensor data from the sensors 122.

The doorbell device 126 may be an electronic computing device that is placed on the exterior of the property 101 and configured to capture video and image footage of an exterior region of the property 101. In some implementations, the doorbell device 126 can be a connected device placed on the front door of the property 101 that is capable of receiving a button press from an individual near the front door (e.g., the individual 104). In such implementations, the doorbell device 126 may be configured to exchange communications with a separate security camera that captures footage of the front exterior of the property 101. Alternatively, in other implementations, the doorbell device 126 may include one or more integrated camera devices that are capable of capable of collecting footage of the exterior region. The integrated cameras may also be capable of detecting motion within the exterior region such that, after initially detecting a doorbell press, the doorbell device 126 can correlate a doorbell press detection event and subsequent motion detected within the exterior region in order to identify possible security risks to the property 101.

In some implementations, the doorbell device 126 may be capable of performing one or more response actions to a detected doorbell press to deter possible intruders. For instance, the doorbell device 126 can include a speaker that plays a pre-recorded message of the authorized user 102 to indicate that someone is presently within the property 101 even when the property 101 is unoccupied. In other examples, the doorbell device 126 may be capable of transmitting signals to devices within the property 101 (e.g., the sensors 122, the appliances 124) in response to detecting a doorbell press to simulate occupancy within the property 101. In other examples, the doorbell device 126 may also communicate directly with the monitor control unit 110, which can then relay the communication with the doorbell device 126 to devices within the property over another signal path using a different communication protocol (e.g., Bluetooth, Bluetooth LE, ZWave, ZigBee, etc.).

In some implementations, the doorbell device 126 may analyze videos or images captured of the detectable regions for the presence of persons in the captured videos or images. For instance, the doorbell device 126 may use image processing techniques in order to identify shapes in the captured images that resemble a human body near the front door of the property 101 where the doorbell device 126 is located. The doorbell device 126 also may analyze the images for moving objects (or use other techniques to identify moving objects) and target imaging on capture of moving objects.

Based on detection of the individual 104, the doorbell device 126 may lock onto the location of the individual 104 within the exterior region and follow the individual 104 within the exterior region. In addition, once the doorbell device 126 locks onto the individual 104, the doorbell device 126 can transmit a signal to the monitor control unit 110 to coordinate operations between the sensors 122 and the appliances 124 and gather data collected by these devices to determine a security state associated with the property 101.

Upon detection of the individual 104, the doorbell device 126 can also transmit a signal to the monitor control unit 110. For instance, the transmitted signal may include attributes of the individual 104, motion detection data within the exterior region, the number of doorbell presses received within a particular time period, and/or a time duration represented by the particular time period. Based on the information included within the transmitted signal, the monitor control unit 110 may determine whether there may be a potential security concern for the property 101 and take action accordingly. For example, metadata associated with the information included within the transmitted signal can be transferred to the central monitoring station 130 or a central alarm station server.

In some implementations, the doorbell device 126 may perform image recognition processing on the captured videos or images of the exterior region in an attempt to detect whether any of the identified individual are authorized users (e.g., users authorized to access the property 101). In these examples, the doorbell device 126 may have access to images of authorized users of the property 101 and may compare images being captured to the accessed images of authorized users. Based on the comparison, the doorbell device 126 may use facial recognition techniques to determine whether the imaged user matches an authorized user 102 of the property 101. The doorbell device 126 may then use the determination of whether the imaged user matches an authorized user 102 of the property 101 or an intruder to control further tracking operation.

For example, based on a determination that the imaged user is an intruder, the doorbell device 126 may continue tracking the intruder and ensure that sufficient videos or images to identify the intruder have been captured. Alternatively, based on a determination that the imaged user is an authorized user, the doorbell device 126 may discontinue tracking the authorized user. The doorbell device 126 also may report the location of the authorized user 102 to the monitor control unit 110.

In other examples, the doorbell device 126 or the monitor control unit 110 can also store a blacklist that specifies a list of known individuals that the authorized user has indicated should not be able to access the property 101. The blacklist may include one or more photos of the known individuals that the integrated that are compared to photos of individuals detected within the detectable region. In response to determining that the detected image of an individual within the detectable region matches at least one photograph of an individual within the blacklist, the doorbell device 126 or the monitor control unit 110 can take security measures to restrict access to the property 101. For example, in response to determining that the captured photo of the individual within the detectable region matches a photograph of an individual within the blacklist, the monitor control unit 110 can transmit a signal to the central monitoring station 130 indicating a potential security risk to the property 101, and an alert with the photograph can then be transmitted to the user 140.

The central monitoring station 130 may be an electronic device configured to provide monitoring services by exchanging electronic communications with the monitor control unit 110 and/or the user device 140 over the local network 105 and the Internet. For example, the central monitoring station 130 may be configured to monitor events (e.g., a present security status, alarm events detected) generated by the monitor control unit 110 and/or other devices connected over the local network 105. In this example, the central monitoring station 130 may exchange electronic communications with the network module included in the monitor control unit 110 to receive information regarding events detected by the monitor control unit 110.

The central monitoring station 130 may also exchange data communications with the user device 140 associated with the authorized user 102 of the property 101. For instance, the central monitoring station 130 may be associated with an application provided by that runs on the user device 150. In some instances, the application may be provided by the service provider that operates and maintains the operations of the central monitoring station 130. The application may provide various types of information related to the local network 105 within the property 101. For example, the application may provide an authorized user 102 with information relating to a current security status of the property 101, data that is being monitored by the monitor control unit 110, and/or historical door press data associated with the property 101. In addition, the authorized user 102 may use the application to remotely monitor, configure, and/or adjust the monitoring operations performed by either the monitor control unit 110 or the central monitoring station 130.

The central monitoring station 130 can be operated and maintained by a service provider that is associated with the monitoring system installed within the property 101. For example, the service provider may provide a subscription-based security services package that includes various monitoring features that are performed by a combination of the monitor control unit 110, the sensors 122, the appliances 124, the doorbell device 126, and/or the central monitoring station 130. For example, the service provider may provide a monitoring service by which an associated service administrator associated with the service provider responds to a detected doorbell press when the authorized user 102 is either located outside the property 101 or currently unavailable to the answer the door. More detailed descriptions relating to this example are provided in greater detail below.

The user device 140 may be an electronic device associated with the authorized user 102 (e.g., a property owner or an occupant) that exchanges network communications over the local network 105. For example, the user device 140 may be one or more of a smartphone, a tablet computing device, personal computing device (PCs), a network-enabled media player, a home entertainment system, a cloud storage device, and other types of network-enabled devices. The user device 140 may access a service made available by the central monitoring station 130 on the network 105, such as a mobile application. The data generated by the user device 140 may include over the network 105, which may be monitored by the monitor control unit 110.

The user device 140 can include a native surveillance application. The native surveillance application refers to a software/firmware program running on the corresponding mobile device that enables the user interface and features described throughout. The user device 140 may load or install the native surveillance application based on data received over a network (e.g., the network 105) or data received from local media. The native surveillance application runs on mobile devices platforms. The native surveillance application also enables the user device 140 to receive and process image and sensor data from the monitoring system.

In some implementations, the user device 140 communicates with and receive monitoring system data from the monitor control unit 110 using a communication link. For instance, the user device 140 may communicate with the monitor control unit 110 using various local wireless protocols such as Wi-Fi, Bluetooth, Zwave, ZigBee, HomePlug (Ethernet over powerline), or wired protocols such as Ethernet and USB, to connect the user device 140 to local security and automation equipment. The user device 140 may connect locally to the monitoring system and sensors 122 and other devices. The local connection may improve the speed of status and control communications because communicating through the network 105 with a remote server (e.g., the central monitoring station 130) may be significantly slower.

Although the user device 140 is shown as communicating with the central monitoring station 130, the user device 140 may also communicate directly with the sensors 122 and other devices controlled by the monitor control unit 110 when the user device 140 is near or within the property 101. For example, the user device 140 may exchange communications with the devices of the system 100 over the network 105 when the individual 104 is located within the property 101.

In some implementations, the user device 140 receives monitoring system data captured by the monitor control unit 110 through the network 105. The user device 140 may receive the data from the monitor control unit 110 through the network 105 or the central monitoring station 130 may relay data received from the monitor control unit 110 to the user device 140 through the network 105. In this regard, the central monitoring station 130 may facilitate communication between the user device 140 and the monitoring system.

In some implementations, the monitor control unit 110 performs the monitoring operations described above over the network 105 without being physically present within the property 101. For example, the monitor control unit 110 can be a software module within the central monitoring station 130, which exchanges data communications with the doorbell device 126. The doorbell device 126 may exchange communications with the central monitoring station 130 through the network 105, or alternatively, through a separate cellular network that connects the doorbell device 126 and the central monitoring station 130. In these examples, the central monitoring station 130 includes one or more software modules that are capable of performing the operations of both the monitor control unit 110 and the central monitoring station 130 as described above.

Figure 2:
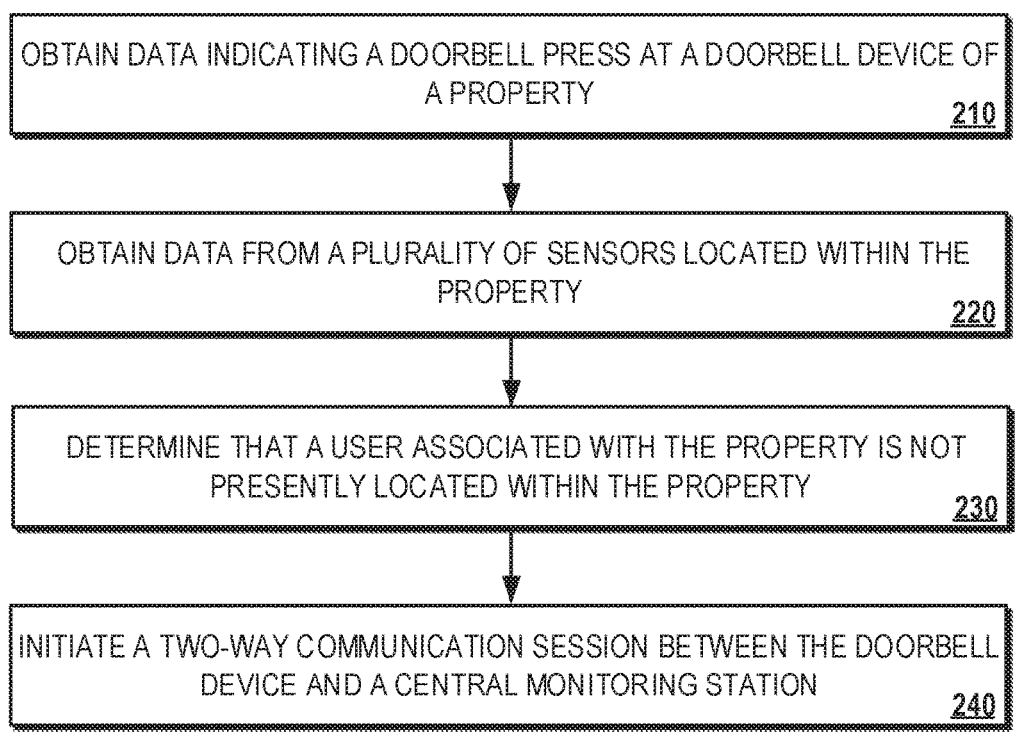
FIG. 2 illustrates an example of a process for automatically initiating a two-way communication session between a doorbell device and a central monitoring station.

FIG. 2 illustrates an example of a process 200 for automatically initiating a two-way communication session between a doorbell device and a central monitoring station. Briefly, the process 200 may include data indicating a doorbell press at a doorbell device of a property (210), obtaining data from a plurality of sensors located within the property (220), determining that a user associated with the property is not presently located within the property (230), and initiating a two-way communication session between the doorbell device and a central monitoring station (240).

In more detail, the process 200 may include obtaining data indicating a doorbell press at a doorbell device of a property (210). For instance, the monitor control unit 110 may obtain data from the doorbell device 126 indicating that the individual 102 has pressed a doorbell of the property 101. In some instances, the obtained data can also include security footage of motion detected within an exterior region of the property 101 that is within a field of view of the doorbell device 126. The obtained data may include other types of information that can be used to determine if the individual 104 is likely to represent a potential security risk to the property 101. For example, the obtained data may include a number of doorbell presses, the time of the detected doorbell press, or detected motion by the individual 104 in response to determining that the property 101 is presently vacant.

The process 200 may include obtaining data from a plurality of sensors located within the property (220). For instance, after obtaining the data from the doorbell device 126, the monitor control unit 110 may also gather data collected by the sensors 122, the appliances 124, or other devices connected to the local network 105. The obtained data can include, for example, sensor data indicating occupancy information inside the property 101 at the time of the detected doorbell press (e.g., the number and identity of the occupants within the property 101), location information of the user device 140 indicating whether an authorized user 102 is presently located within the property 101, a present security status of the property 101 (e.g., "armed," "disarmed), and/or usage data for the appliances 124 (e.g., number of devices that are currently on, recent usage patterns prior to the detection of the doorbell press).

In some implementations, the monitor control unit 110 may aggregate the received data from the sensors 122, the appliances 124, and other devices connected over the local network 105. The monitor control unit 110 may aggregate the obtained data based on using pattern recognition techniques in order to determine subsets of the received information to transmit to the central monitoring station 130.

The process 200 may include determining that a user associated with the property is not presently located within the property (230). For instance, the monitor control unit 110 may determine that the authorized user 102 is not presently located within the property 101 based on the obtained data from the sensors 122, the appliances 124, and/or the user device 140. For example, if location data obtained from the user device 140 indicates that the user device 140 is not presently located within the property 101, the monitor control unit may determine that the authorized user 102 is not presently located within the property 101. In other examples, this determination can be based on obtained occupancy data indicating that the property 101 is presently occupied, or motion sensor data indicating no detected motion within the property over a certain period of time.

In some implementations, the monitor control unit 110 may determine that the authorized user 102 is presently located within the property 101 but is unavailable to answer the doorbell press of the property because he/she may be preoccupied by another activity (e.g., sleeping, cooking, or located in an area where the doorbell sound is inaudible). In other implementations, the monitor control unit 110 may determine if users that are present within the property are capable of answering the doorbell press. For example, if the users that occupy the property 101 are children, then the monitor control unit 110 may determine that there are no authorized users that are available to respond to the doorbell press of the property 101.

The process 200 may include initiating a two-way communication session between the doorbell device and a central monitoring station (240). For instance, in response to determining that the authorized user 102 (or any other authorized user) is not presently located within the property 101, the monitor control unit 110 may transmit a request to the central monitoring station 130 to initiate a two-way communication session between the doorbell device 126 and the central monitoring station 130. In response to receiving the request, a service administrator associated with a security provider of the property 101 may utilize the interface 132 to initiate the two-way communication session with the individual 104. As described above, the communication session may either be a video or an audio conference. After the two-way conference has been initiated, audio or video may be provided for output to the individual 104 through an output device associated with the doorbell device 126. For instance, if the two-way communication session is a video conference, the doorbell device 126 may include a display that provides a video feed of the service administrator. Alternatively, if the two-way communication is an audio conference, the doorbell device 126 may include one or more speaks that provide an audio feed of the service administrator. The two-way communication may be conducted over the network 105 through the direction and control of the monitor control unit 110.

Figure 3A:
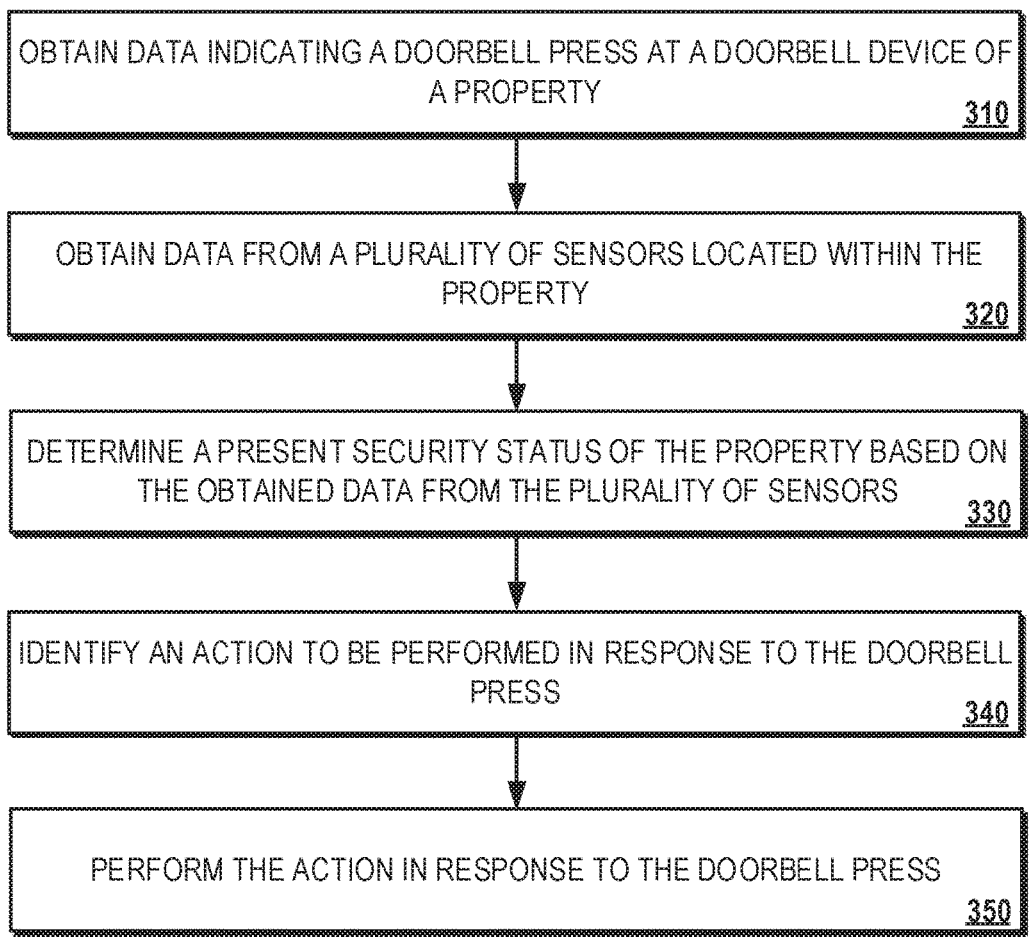
FIG. 3A illustrates an example of a process for automatically performing designated action in response to a doorbell press based on sensor data associated with a property.

FIG. 3A illustrates an example of a process 300A for automatically performing designated action in response to a doorbell press based on sensor data associated with a property. Briefly, the process 300A may include obtaining data indicating a doorbell press at a doorbell device of a property (310), obtaining data from a plurality of sensors located within the property (320), determining a present security status of the property based on the obtained data from the plurality of sensors (330), identifying an action to be performed in response to the doorbell press (340), and performing the action in response to the doorbell press (350).

In more detail, the process 300A may include obtaining data indicating a doorbell press at a doorbell device of a property (310). For instance, the monitor control unit 110 may obtain data from the doorbell device 126 indicating that the individual 102 has pressed a doorbell of the property 101. In some instances, the obtained data can also include security footage of motion detected within an exterior region of the property 101 that is within a field of view of the doorbell device 126. The obtained data may include other types of information that can be used to determine if the individual 104 is likely to represent a potential security risk to the property 101. For example, the obtained data may include a number of doorbell presses, the time of the detected doorbell press, or detected motion by the individual 104 in response to determining that the property 101 is presently vacant.

The process 300A may include obtaining data from a plurality of sensors located within the property (320). For instance, after obtaining the data from the doorbell device 126, the monitor control unit 110 may also gather data collected by the sensors 122, the appliances 124, or other devices connected to the local network 105. The obtained data can include, for example, sensor data indicating occupancy information inside the property 101 at the time of the detected doorbell press (e.g., the number and identity of the occupants within the property 101), location information of the user device 140 indicating whether an authorized user 102 is presently located within the property 101, a present security status of the property 101 (e.g., "armed," "disarmed), and/or usage data for the appliances 124 (e.g., number of devices that are currently on, recent usage patterns prior to the detection of the doorbell press).

The process 300A may include determining a present security status of the property based on the obtained data from the plurality of sensors (330). For instance, the monitor control unit 110 may identify a security status associated with a security system of the property 101 based on the data obtained from the sensors 122, the appliances 124, or other devices connected over the local network 105. The security status may indicate whether the authorized user 102 or a security provider previously armed the security system of the property 101 prior to the detected doorbell press. The security status can be used to identify a potential security risk that may be caused by the detected doorbell press given the present conditions of the property 101.

In some implementations, instead of being a dedicated status associated with the security system, the security status may instead be determined by the monitor control unit 110 based on the received data from the sensors 122 or the appliances 124. For example, the monitor control unit 110 can use an aberrant engine to initially determine if the obtained data includes information indicating a potential security breach within the interior or exterior of the property 101, and in response, the monitor control unit 110 can designate a security status for the property 101 that indicates the potential security breach. As an example, the monitor control unit 110 may determine a low risk security status for the property 101 if the obtained data indicates significant activity and/or level of occupancy within the property 101 at the time when a doorbell press is detected by the doorbell device 126. In another example, the monitor control unit 110 may determine a high risk security status if the doorbell press is detected during an odd time (e.g., 3 A.M.) when the property 101 is determined to be vacant because the authorized user 102 and other users are not presented located within the property 101.

The process 300A may include identifying an action to be performed in response to the doorbell press (340). For instance, the monitor control unit 110 may initially transmit a data package to the central monitoring station 130 that includes doorbell information associated with the detected doorbell press. As described above, the doorbell information can be based on the data received from the sensors 122 or the appliances 124. In response, the central monitoring station 130 may access a doorbell action repository in order to determine an appropriate action to be performed in response to the detected doorbell press. As described below with respect to FIG. 3B, the determination of the appropriate action can be based on a set of indicators associated with the present condition of the property 101 at the time of the doorbell press (e.g., occupancy information, doorbell information, security information).

The process 300A may include performing the action in response to the doorbell press (350). For instance, after determining the appropriate action to be performed based on selecting an action from the doorbell action repository, the monitor control unit 110 may perform the selected action. For instance, the monitor control unit 110 may transmit a distributed signal to one or more devices within the property 101 to perform a particular action. As described above with respect to FIG. 2, one example of an action that is performed is initiating a two-way communication session between the central monitoring station 130 and the doorbell device 126. In this example, the monitor control unit 110 may transmit an instruction to the doorbell device 126 to initiate a two-way communication over the local network 105 such that a service administrator may respond to the detected doorbell press. Other examples actions that can be performed are described in more detail below with respect to FIG. 3B.

Figure 3B:
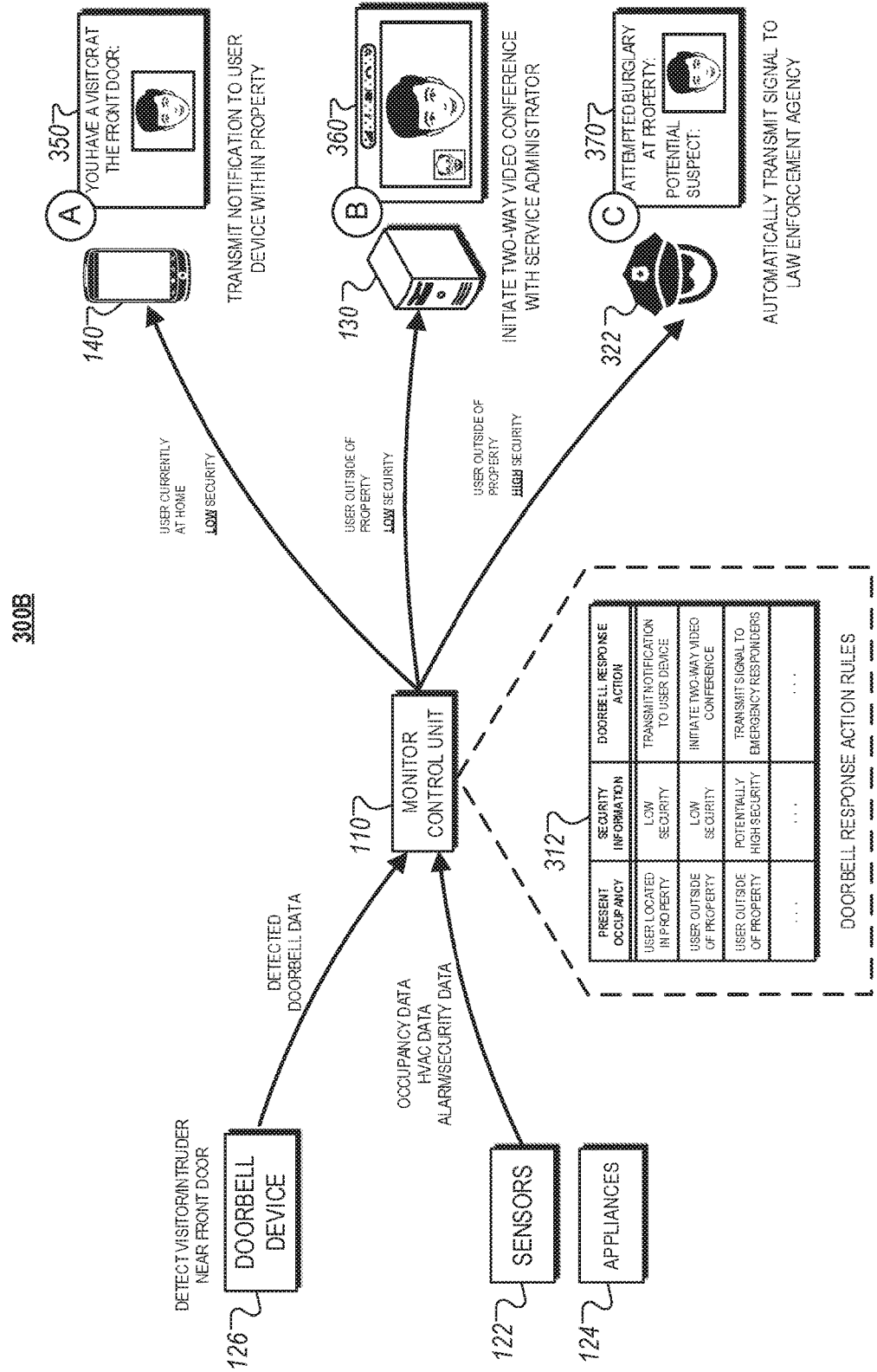
FIG. 3B illustrates an example of a system that is capable of automatically performing designated action in response to a doorbell press based on sensor data associated with a property.

FIG. 3B illustrates an example of a system 300B that is capable of automatically performing a designated action in response to a detected doorbell press based on sensor data associated with a property 101. The system 300B may include the doorbell device 126, the sensors 122, the monitor control unit 110, the mobile device 140, the central monitoring station 130, and a law enforcement system 322.

In general, the monitor control unit 110 may use data obtained from the sensors 122 and/or the appliances 124 to automatically determine and perform a specified action in response to a doorbell press detected by the doorbell device 126. As described above, this can be accomplished by identifying the present conditions for the property 101 (e.g., occupancy, security status) and selecting a particular doorbell response action from among a set of actions specified within a doorbell action repository 312. In the examples depicted in the figure, the doorbell action repository 312 includes three examples of doorbell response actions that can be performed by the monitor control unit 110 based on the data obtained from the doorbell device 126, the sensors 122, and/or the appliances 124.

In the first example, represented by the letter "A," the monitor control unit 110 transmits a notification 350 to the user device 140, which is determined to be located within the property 101. The notification 350 notifies the authorized user 102 that there is the individual 104 is at the front door of the property 101. The notification 350 also includes an image or video of the individual 104 captured by the doorbell device 126 in response to the detected doorbell press. In this example, the monitor control unit 110 performs this particular action because the present conditions of the property 101, based on the obtained data from the sensors 122 and the appliances 124, indicates that the authorized user 102 is currently at home, and the security status associated with the doorbell press indicates a low risk of intrusion.

In the second example, represented by the letter "B," the monitor control unit 110 transmits a request to the central monitoring station 130 to initiate a two-way communication session between the doorbell device 126 and the central monitoring station 130. In this example, a service administrator associated with the security provider of the property 101 can use an interface 360 to initiate a two-way video communication conference with the individual 104 through doorbell device 126. In this example, the monitor control unit 110 performs this particular action because the authorized user 102 is determined to be on vacation and has indicated that he/she would not like to receive updates regarding doorbell presses at the property 101. In addition, the present conditions of the property 101 indicates that the security status associated with the doorbell press indicates a low risk of intrusion. The service administrator can then either provide security-related information to the individual 104 to reduce a chance of intrusion, transmit an instruction to unlock the front door and provide access to the individual 104 if the authorized user 102 has provided permission to the individual 104 in advance. In some instances, the interface 360 corresponds to the interface 132 described previously with respect to FIG. 1.

In the third example, represented by the letter "C," the monitor control unit 110 transmits an alert notification 370 to a system associated with a law enforcement agency 322 indicating that there may be a potential attempted burglary presently taking place at the property 101. In this example, the monitor control unit 110 performs this particular action because the authorized user 102 is determined to be remote from the property 101 at the time of the detected doorbell press and the present conditions of the property 101 indicates that the security status associated with the doorbell press indicates a high risk of intrusion. The notification 370 includes information related to the detected doorbell press and an image of the individual 104 captured by the doorbell device 126.

Although not illustrated in FIG. 3B, in some implementations, in response to detecting a doorbell press, the monitor control unit 110 may additionally or alternatively transmit instructions to the sensors 122 and/or the appliances 124 to perform specified actions that emulate conditions indicating that the property 101 is presently occupied by a user. For example, the monitor control unit 110 may transmit signals to automatically turn lights on and off to deter a possible intruder. In another example, the monitor control unit 110 may play a pre-recorded audio sequence that provides an impression that the authorized user 102 is presently located within the property 101.

Although FIG. 3B illustrates the monitor control unit 110 automatically performing a designated action in response to a detected doorbell press, in some implementations, the operations described above can be performed by the central monitoring station 130. For example, as described above with respect to FIG. 1, the monitor control unit 110 can be a software module of the central monitoring station 130 that is configured to perform the operations described above over a network (e.g., the local network 105, or a cellular network that connects the doorbell device 126 and the central monitoring station 130). In such implementations, the operations described above with respect to FIG. 3B can be carried out remotely over a cloud network without requiring a separate device for the monitor control unit 110. In this regard, the operations described above may be performed for properties that have less sophisticated monitoring systems that lack a dedicated monitoring panel to control and/or adjust the monitoring operations of network-enabled devices (e.g., the sensors 122 and the appliances 124).

Figure 4:
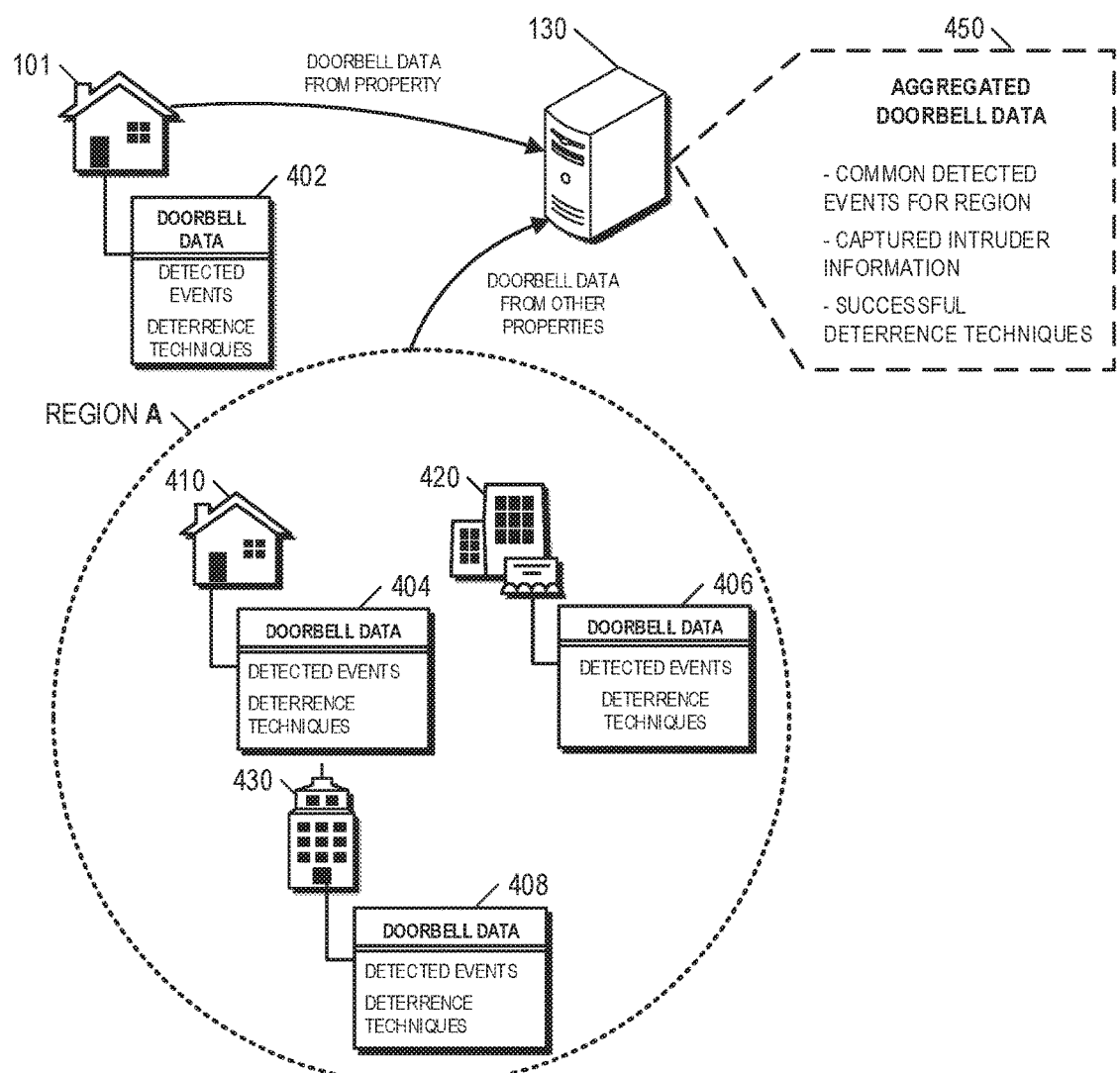
FIG. 4 illustrates an example of a system that is capable of aggregating doorbell data indicating prior intruder events across multiple properties.

FIG. 4 illustrates an example of a system 400 that is capable of aggregating doorbell data indicating prior intruder events across multiple properties. The system 400 may include the central monitoring station 130, which obtains doorbell data collected at the property 101 depicted in FIG. 1 and multiple other properties 410, 420, and 430 located within a specific region (e.g., region A). The doorbell data obtained from the multiple properties can then be processed in order to generate aggregated doorbell data 450. In some implementations, the system 100 includes the system 400 illustrated in the figure.

In general, central monitoring station 130 can obtain doorbell data 402, 404, 406, and 408 from the properties 101, 410, 420, and 430, respectively. The doorbell data can include, for example, historical data related to doorbell detection events at each of the respective properties. For example, the doorbell data include event logs related to when two-communication sessions were initiated in response to a detected event, and the actions taken by service administrators in order to deter individuals from intruding upon a property. In implementations where actions are automatically performed by a monitor control unit 110 in response to detected doorbell press (e.g., as illustrated in FIG. 3B), the doorbell data can include a list of previously actions taken and indications as to whether each of the previously taken actions were successful in deterring intrusions at the respective properties. The doorbell data can also include classifications for detected events (e.g., points of entry, time periods of intrusions, etc.) in order to classify detected events across multiple properties within Region A.

After obtaining the doorbell data from multiple properties, the central monitoring station 130 may use various pattern recognition techniques to identify common vulnerabilities across multiple properties located within a particular geographic region (e.g., the Region A) based on the historical doorbell data associated with each of the properties within the particular geographic region. For example, the central monitoring station 130 may identify common periods in which intrusion events have previously taken place, reoccurring types of motion data associated the intrusion events, among other types of sensor information. The patterns identified by the central monitoring station may be stored in the aggregated doorbell data 450.

In some implementations, the aggregated doorbell data 450 can be used provide security forecasts relating to predicted intrusion events related to a particular geographic region. For example, common patterns associated with intrusion events detected in multiple properties within the particular geographic region can be used to predict likelihood that the patterns are likely to reoccur at subsequent time periods within the particular geographic region. In such implementations, if the aggregated doorbell data 450 indicates a high likelihood that an intrusion event is likely to occur within a particular geographic region (e.g., based on current conditions matching prior conditions when a historical event took place), then central monitoring station 130 may transmit alert notifications to user devices associated each of the properties within the geographic region to take precautionary measures to ensure that their property is safe and protected. Alternatively, the data can also be transmitted to local law enforcement agencies in order to improve investigation efforts if an intrusion event does actually take place at a subsequent time point.

As discussed above, the aggregated doorbell data 450 can identify different types of deterrence techniques previously applied by, for example, monitoring systems of the properties 410, 420, 430 in response to previously detected doorbell presses where an individual is predicted to be an intruder. An example of a deterrence technique can be playing a voice projection from a speaker placed within a property to provide the impression that a property is occupied even it is not occupied. For instance, in response to a detected doorbell press, a monitoring system can provide a signal of network-enabled device to play a pre-recorded audio file that emulates a user's response to a detected doorbell press.

The aggregated doorbell data 450 can also include various types of information associated with previously applied deterrence techniques to determine whether a particular deterrence technique was successfully applied (i.e., whether a previously applied deterrence prevented a predicted intrusion at the property). The central monitoring station 130 can then apply statistical testing techniques to identify deterrence techniques that are more likely to prevent subsequent intrusions at a property within a specific geographic region. For example, the central monitoring station 130 can generate apply various regression-based statistics to the doorbell data 404, 406, and 408 to generate a predictive model that identifies a respective likelihood that a particular deterrence technique will prevent a subsequent predicted intrusion at, for example, the property 101. Data used to generate the predictive model can be based on data that is passively collected by the monitoring systems of different properties, e.g., log data indicating detected doorbell presses and sensor data collected after detected doorbell presses. In this instance, the properties can be connected within a property network that is monitored by the central monitoring station 130. Additionally, or alternatively, the data used to generate the predictive model can also be based on user feedback actively provided by users of the multiple properties. For example, users can provide reviews and/or opinions on different previously applied deterrence techniques so that the central monitoring station 130 can use the user feedback data to identify the deterrence techniques that are likely to be successful in preventing future intrusions.

Figure 5:
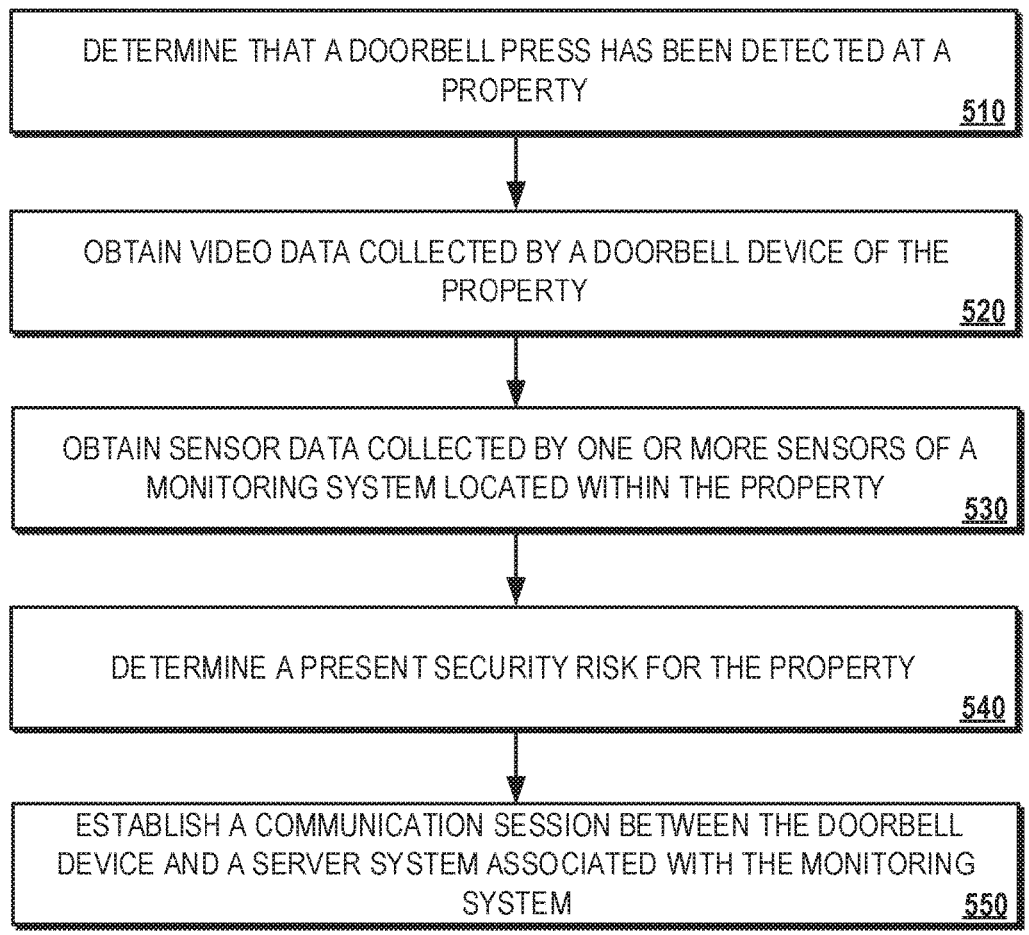
FIG. 5 illustrates an example of a process for establishing a communication session in response to a detected doorbell press at a property.

FIG. 5 illustrates an example of a process 500 for establishing a communication session in response to a detected doorbell press at a property. Briefly, the process 500 can include the operations of determining that a doorbell press has been detected at a property (510), obtaining video data collected by a doorbell device of the property (520), obtaining sensor data collected by one or more sensors of a monitoring system located within the property (530), determining a present security risk for the property (540), and establishing a communication session between the doorbell device and a server system associated with the monitoring system (550).

In general, the process 500 is described in reference to system 100, although any system can additionally or alternatively perform the operations of the process 500. Additionally, one or more of the operations of the process 500 can be performed by the doorbell device 126, the central monitoring station 130, the doorbell device 126, or a combination thereof. For example, the doorbell device 126 can determine that a doorbell press has been detected at the property 101, and the monitor control unit 110 can determine a present security risk for the property 101 and in response, establish a communication session between the doorbell device 126 and the central monitoring station 130. In another example, the central monitoring station 130 alternatively determines the present security risk for the property 101 and in response, establishes the communication.

In more detail, the process 500 can include the operation of determining that a doorbell press has been detected at a property (510). For example, the monitor control unit 110 and/or the central monitoring station 130 can determine a doorbell press has been detected at the property 101. The doorbell press can be detected based on video data collected by the doorbell device 126, e.g., video data of the exterior of the property 101. Additionally, or alternatively, the doorbell press can be detected by a doorbell sensor placed on the doorbell of the property 101 that generates a signal based on a detected actuation of the doorbell.

The process 500 can include the operation of obtaining video data collected by a doorbell device of the property (520). For example, the monitor control unit 110 and/or the central monitoring station 130 can obtain video data collected by the doorbell device 126 of the property 101. As discussed above, the video data can include video footage of an exterior region of the property 101 surrounding the front entrance. The video data can also identify an individual that provides a doorbell press or approaches the front entrance of the property. In some instances, the video data can include video footage of entrances of the property besides the front entrance, such as a back entrance, side entrance, basement entrance, etc.

In some implementations, the monitor control unit 110 and/or the central monitoring station 130 processes the video data using facial recognition techniques to identify the identity of a user that is detected within the video data. For example, if the detected user is identified as a known user that is authorized to enter the property 101, e.g., an occupant of the property 101, then the monitor control unit 110 and/or the central monitoring station 130 can automatically provide access to the property 101. In another example, if the detected user is identified as an unknown user, then the monitor control unit 110 and/or the central monitoring station 130 can output playback of a pre-recorded video and/or a message on a display of the doorbell device 126. In yet another example, if the detected user is identified as likely representing an intruder, then the monitor control unit 110 and/or the central monitoring station 130 can automatically initiate a two-way communication session as depicted in the example of FIG. 1.

The process 500 can include the operation of obtaining sensor data collected by one or more sensors of a monitoring system located within the property (530). For example, the monitor control unit 110 and/or the central monitoring station 130 can obtain sensor data collected by the sensors 122 located within the property 101. As discussed above, the obtained sensor data can be used to identify present conditions within the property 101 when the doorbell press is detected. For example, the obtained sensor data can be used to determine a present occupancy within the property 101 when the doorbell press is detected. As another example, the obtained sensor data can be used to determine whether a user occupying the property 101 is likely to respond to the detected doorbell press. For instance, if the user is detected in a location where the doorbell press is not likely to be heard, e.g., the basement, the monitor control unit 110 and/or the central monitoring station 130 may nonetheless determine the likelihood of a security risk at the property 101.

The process 500 can include the operation of determining a present security risk for the property (540). For example, the monitor control unit 110 and/or the central monitoring station 130 can determine a present security risk for the property 101 based on obtaining sensor data collected by the sensors 122. The security risk can represent a likelihood that an intrusion will occur after a doorbell press has been detected at the property 101. As discussed above, the security risk can be determined based on the present occupancy of the property 101, the current location of the user 102, the likelihood that the user 104 detected by the doorbell device 126 represents an intruder, the present status of windows or doors, e.g., open/closed, or a combination of multiple indicators. In one example, determining the present security risk at the property includes determining that the property 101 is presently unoccupied when the doorbell press is detected at the property 101.

In this example, the monitor control unit 110 and/or the central monitoring station 130 determines a security risk because the property 101 is susceptible to intrusion because the detected doorbell press may be an intruder that is attempting to determine whether the property 101 is presently unoccupied. In another example, determining the present security risk at the property 101 includes determining that the mobile device 140 of the user 102 is not presently located within the property when the doorbell press is detected at the property. In this example, the monitor control unit 110 and/or the central monitoring station 130 determines a security risk because the user 102 is unable to respond to the doorbell press. In yet another example, determining the present security risk for the property 101 includes processing video data collected by the doorbell device 126. The processing video can include identifying an individual within the video data collected by the doorbell device 126, and determining a likelihood that the identified individual is an intruder based on the sensor data collected by the sensors 122. In this example, the monitor control unit 110 and/or the central monitoring station 130 determines a security risk if the likelihood satisfies a predetermined threshold associated with a security risk at the property 101. For instance, the threshold can be defined based on the clothing worn by the user, time when the doorbell press is detected, the number of times the doorbell is pressed, the number of detected doorbell presses within a specified period of time, among others.

In some implementations, the monitor control unit 110 and/or the central monitoring station 130 provides a communication indicating the determined security risk to the mobile device 140 of the user 102. The communication can represent a text message, an email, or an application notification. The communication can include a summary of the present conditions within the property determined based on the sensor data, e.g., the number of users occupying the property 101, status of windows or doors, among others. The communication can also include video data collected by the doorbell device 126 in response to the detected doorbell press. For example, the communication can include a photo image from video footage of an individual detected near the exterior of the property 101.

The process 500 can include the operation of establishing a communication session between the doorbell device and a server system associated with the monitoring system (550). For example, the monitor control unit 110 and/or the central monitoring station 130 can establish a communication session between the doorbell device 126 and the central monitoring station 130. As discussed above with respect to FIG. 1, the communication session can enable a system administrator associated with a service provider that manages the monitoring system 100 to answer the detected doorbell press. In some instances, such as the example depicted in FIG. 1, the established communication can be a two-way video conference between the doorbell device 126 and the central monitoring station 130. In such instances, a video feed of the system administrator can be presented on the display of the doorbell device 126. In other instances, the communication can be an audio conference. Additionally, or alternatively, in some implementations, the established communication session can include providing a recorded video for output on a display of the doorbell device 126. For example, the recorded video can be of the user 102 providing a message to an individual that presses a doorbell of the property 101. In another example, the recorded video can be one that gives an individual that provides the doorbell press the impression that the property 101 is presently occupied even though it is actually unoccupied.

In some implementations, the monitor control unit 110 and/or the central monitoring station 130 can perform different types of system actions based on a present condition of the property 101 when the doorbell press is detected by the doorbell device 126. In such implementations, the monitor control unit 110 and/or the central monitoring station 130 can access a doorbell action repository that specifies a different system action for each present condition of the property 101. For instance, as shown in the example depicted in FIG. 3B, the doorbell action repository can include a system action for transmitting a notification of a detected doorbell press to the mobile device 140 if the present condition indicates low security state. The doorbell action repository can also include another system action for transmitting a notification of an attempted burglary at the property 101 to a law enforcement agency if the present condition indicates a high security state. The monitor control unit 110 and/or the central monitoring station 130 selects a particular system from the doorbell action repository based on matching a determined present condition to a corresponding system action specified by the doorbell action repository.

In some implementations, determining the present security risk for the property 101 includes determining that the user 102 presently occupies the property 101 when the doorbell press is detected at the property, and is presently unable to answer the detected doorbell press. For example, the user 102 can be determined to be located in a region of the property 101 where the doorbell press is unable to be heard by the user 102, e.g., the basement, the backyard, etc. As another example, activity sensors within the property 101 can be used to determine that the user 102 is performing an action that may distract him/her from hearing the detected doorbell press, e.g., activity indicating that the user 102 is sleeping when the doorbell press is detected. In such implementations, the monitor control unit 110 and/or the central monitoring station 130 establishes the communication discussed above based on determining that the user 102 presently occupies the property 101 but is presently unable to answer the detected doorbell press.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   determining, by a computing device located in a property, that a doorbell press has been detected at the property;
   in response to determining the doorbell press has been detected at the property:
      obtaining, by the computing device, video data collected by a doorbell device of the property, and
      obtaining, by the computing device, sensor data collected by one or more sensors of a monitoring system located within the property;
   determining, by the computing device, a present security risk for the property based at least on the sensor data and the video data; and
   in response to determining the present security risk for the property, establishing, by the computing device, a communication session between the doorbell device and a server system associated with the monitoring system, the communication session permitting the server system to (i) access the video data collected by the doorbell device of the property and (ii) perform one or more actions associated with the present security risk for the property.

2. The method of claim 1, wherein determining a present security risk for the property comprises:
   determining, based on the sensor data, that the property was unoccupied when the doorbell press was detected; and
   determining, based on the sensor data and the video data, a likelihood that an individual that provided the doorbell press is an intruder.

3. The method of claim 2, wherein:
   the one or more actions associated with the present security risk for the property comprises an action to transmit an alert notification to a law enforcement agency; and
   the alert notification indicates that the individual that provided the doorbell press is an intruder.

4. The method of claim 2, wherein:
   the one or more actions associated with the present security risk for the property comprises an action to transmit an alert notification to a user device of a user associated with the property; and
   the alert notification indicates that the individual that provided the doorbell press is an intruder.

5. The method of claim 2, wherein:
   the one or more actions associated with the present security risk for the property comprises an action to access additional sensor data collected at the property before the doorbell press was detected at the property; and
   the additional sensor data indicates that individual attempted to enter the property before the doorbell press was detected at the property.

6. The method of claim 1, wherein determining a present security risk for the property comprises determining that a user device of a property administrator was not located within the property when the doorbell press was detected at the property.

7. The method of claim 1, the communication session comprises a two-way video conference between the doorbell device and the server system associated with the monitoring system.

8. The method of claim 1, wherein establishing a communication session between the doorbell device of the property and the server system associated with the monitoring system comprises providing a recorded video for output on a display of the doorbell device.

9. The method of claim 1, further comprising:
   determining, by the computing device and based on the sensor data, a present condition of the property when the doorbell press was detected at the property;
   selecting, by the computing device and based on the present condition of the property, a system action from among multiple system actions specified within a doorbell action repository, wherein:
      each system action is associated with a different condition of the property, and the selected system action is associated with a condition that matches the present condition of the property, and
performing the selected system action.

10. The method of claim 1, wherein the computing device comprises the doorbell device.

11. The method of claim 1, wherein the computing device comprises a control unit of the monitoring system.

12. A system comprising:
one or more computers; and
one or more storage devices storing instructions that are operable, when executed by one or more computers, to cause the one or more computers to perform operations comprising:
determining, by a computing device located in a property, that a doorbell press has been detected at the property;
in response to determining the doorbell press has been detected at the property:
obtaining, by the computing device, video data collected by a doorbell device of the property, and
obtaining, by the computing device, sensor data collected by one or more sensors of a monitoring system located within the property;
determining, by the computing device, a present security risk for the property based at least on the sensor data and the video data; and
in response to determining the present security risk for the property, establishing, by the computing device, a communication session between the doorbell device and a server system associated with the monitoring system, the communication session permitting the server system to (i) access the video data collected by the doorbell device of the property and (ii) perform one or more actions associated with the present security risk for the property.

13. The system of claim 12, wherein determining a present security risk for the property comprises:
determining, based on the sensor data, that the property was unoccupied when the doorbell press was detected; and
determining, based on the sensor data and the video data, a likelihood that an individual that provided the doorbell press is an intruder.

14. The system of claim 13, wherein:
the one or more actions associated with the present security risk for the property comprises an action to transmit an alert notification to a law enforcement agency; and
the alert notification indicates that the individual that provided the doorbell press is an intruder.

15. A non-transitory computer-readable medium storing software comprising instructions executable by one or more which, upon such execution, cause one or more computers to perform operations comprising:
determining, by a computing device located in a property, that a doorbell press has been detected at a property;
in response to determining the doorbell press has been detected at the property:
obtaining, by the computing device, video data collected by a doorbell device of the property, and
obtaining, by the computing device, sensor data collected by one or more sensors of a monitoring system located within the property;
determining, by the computing device, a present security risk for the property based at least on the sensor data and the video data; and
in response to determining the present security risk for the property, establishing, by the computing device, a communication session between the doorbell device and a server system associated with the monitoring system, the communication session permitting the server system to (i) access the video data collected by the doorbell device of the property and (ii) perform one or more actions associated with the present security risk for the property.

16. The non-transitory computer-readable medium of claim 15, wherein determining a present security risk for the property comprises:
determining, based on the sensor data, that the property was unoccupied when the doorbell press was detected; and
determining, based on the sensor data and the video data, a likelihood that an individual that provided the doorbell press is an intruder.

17. The non-transitory computer-readable medium of claim 16, wherein:
the one or more actions associated with the present security risk for the property comprises an action to transmit an alert notification to a law enforcement agency; and
the alert notification indicates that the individual that provided the doorbell press is an intruder.

18. The non-transitory computer-readable medium of claim 16, wherein:
the one or more actions associated with the present security risk for the property comprises an action to transmit an alert notification to a user device of a user associated with the property; and
the alert notification indicates that the individual that provided the doorbell press is an intruder.

19. The non-transitory computer-readable medium of claim 16, wherein:
the one or more actions associated with the present security risk for the property comprises an action to access additional sensor data collected at the property before the doorbell press was detected at the property; and
the additional sensor data indicates that individual attempted to enter the property before the doorbell press was detected at the property.

20. The non-transitory computer-readable medium of claim 15, wherein determining a present security risk for the property comprises determining that a user device of a property administrator was not located within the property when the doorbell press was detected at the property.

* * * * *